(12) United States Patent
Cheng et al.

(10) Patent No.: US 11,947,153 B2
(45) Date of Patent: Apr. 2, 2024

(54) BACKLIGHT MODULE AND DISPLAY DEVICE

(71) Applicant: Radiant Opto-Electronics Corporation, Kaohsiung (TW)

(72) Inventors: Hung-Pin Cheng, Kaohsiung (TW); Shih-Fan Liu, Kaohsiung (TW); Chien-Yu Ko, Kaohsiung (TW); Jui-Lin Chen, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 18/143,066

(22) Filed: May 4, 2023

(65) Prior Publication Data
US 2023/0305218 A1 Sep. 28, 2023

Related U.S. Application Data

(63) Continuation of application No. PCT/CN2022/096952, filed on Jun. 2, 2022.

(30) Foreign Application Priority Data

Mar. 25, 2022 (CN) .................. 202210299940.X

(51) Int. Cl.
*F21V 8/00* (2006.01)
(52) U.S. Cl.
CPC ......... *G02B 6/0068* (2013.01); *G02B 6/0086* (2013.01)
(58) Field of Classification Search
CPC ......... G02F 1/133308; G02F 1/133314; G02F 1/1336; G02F 1/133602; G02F 1/133603;
(Continued)

(56) References Cited

U.S. PATENT DOCUMENTS 9,759,936 B2 * 9/2017 Chen .................... H05K 5/0017
2010/0188599 A1 * 7/2010 Arihara ................ G02B 6/0091
349/60
(Continued)

FOREIGN PATENT DOCUMENTS

CN 102865527 A 1/2013
CN 204962493 U 1/2016
(Continued)

OTHER PUBLICATIONS

English Machine Translation of CN 110161753 provided by ESPACENET (Year: 2019).*
(Continued)

*Primary Examiner* — Zheng Song
(74) *Attorney, Agent, or Firm* — Winston Hsu

(57) ABSTRACT

A backlight module and a display device are provided, and the backlight module includes a light guide plate, a plurality of light-emitting components, and a frame. The light guide plate includes a first side, a second side, and two third sides. The light-emitting components are disposed on the first side, and light generated from the light-emitting components enters the light guide plate from the first side. The frame covers the second side and the third sides and includes an opening and at least one buffer portion. The light-emitting components are disposed in the opening, and the buffer portion is disposed on a side of the opening and contacts the light guide plate.

10 Claims, 8 Drawing Sheets

(58) Field of Classification Search
CPC ......... G02F 1/133604; G02F 1/133608; G02B 6/0068
See application file for complete search history.

(56) References Cited

U.S. PATENT DOCUMENTS

| | | | | |
|---|---|---|---|---|
| 2012/0002130 | A1* | 1/2012 | Watanabe | G02F 1/133308 349/60 |
| 2013/0033657 | A1* | 2/2013 | Li | G02F 1/133615 349/60 |
| 2013/0107171 | A1* | 5/2013 | Lee | G02B 6/0068 349/67 |
| 2013/0258702 | A1* | 10/2013 | Kim | G02B 6/0091 362/602 |
| 2014/0112019 | A1* | 4/2014 | Baek | G02B 6/0083 362/613 |
| 2016/0299286 | A1* | 10/2016 | Choi | G02B 6/0068 |
| 2018/0224595 | A1* | 8/2018 | Sugiyama | G02B 6/0083 |

FOREIGN PATENT DOCUMENTS

| | | |
|---|---|---|
| CN | 206833116 U | 1/2018 |
| CN | 208025195 U | 10/2018 |
| CN | 110161753 A | 8/2019 |
| CN | 111458915 A | 7/2020 |
| CN | 210982991 U | 7/2020 |
| CN | 113759603 A | 12/2021 |
| CN | 215117075 U | 12/2021 |
| JP | 2014-52509 A | 3/2014 |
| TW | 200900795 A | 1/2009 |

OTHER PUBLICATIONS

English Machine Translation of CN 113759603 provided by ESPACENET (Year: 2021).*

* cited by examiner

BACKLIGHT MODULE AND DISPLAY DEVICE

CROSS REFERENCE TO RELATED APPLICATIONS

This application is a continuation application of PCT Application No. PCT/CN2022/096952, filed on Jun. 2, 2022, which claims priority from China Patent Application Serial Number 202210299940.X, filed on Mar. 25, 2022. The entire contents of each of which are incorporated herein by reference.

BACKGROUND OF THE INVENTION

1. Field of the Invention

The present invention relates to a backlight module and a display device and more particularly to a backlight module and a display device that have a buffer function.

2. Description of the Prior Art

In liquid crystal display (LCD) devices, since liquid crystals do not emit light themselves, LCD panels require planar light sources provided by backlight modules. In order to reduce thickness of the backlight module and number of light-emitting components, an edge-lit backlight module has been developed. However, in a conventional edge-lit backlight module, the light-emitting components are disposed on a side surface of a light guide plate, and a frame that surrounds the light guide plate and the light-emitting components cannot provide buffer protection for the light guide plate. Accordingly, when a free-fall drop test is performed on the backlight module for reliability, the light guide plate is easily displaced, and then impact from the light guide plate is all absorbed by the light-emitting components, such that the light-emitting components are impacted to fall off by the displacement of the light guide plate, causing damage to the backlight module or failure to meet the reliability standard. Therefore, how to improve the reliability of the backlight module becomes an objective in the related industries.

SUMMARY OF THE INVENTION

According to an embodiment of the present invention, a backlight module is provided and includes a light guide plate, a plurality of light-emitting components, and a frame. The light guide plate includes a first side, a second side, and two third sides. The first side and the second side are opposite to each other, and the third sides opposite to each other and between the first side and the second side are perpendicular to the first side. The light-emitting components are disposed on the first side of the light guide plate, and light generated from the light-emitting components enters the light guide plate through the first side. The frame covers the second side and the third sides of the light guide plate, wherein the frame includes an opening and at least one buffer portion, the light-emitting components are disposed in the opening, and the buffer portion is located on a side of the opening and contacts the light guide plate.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
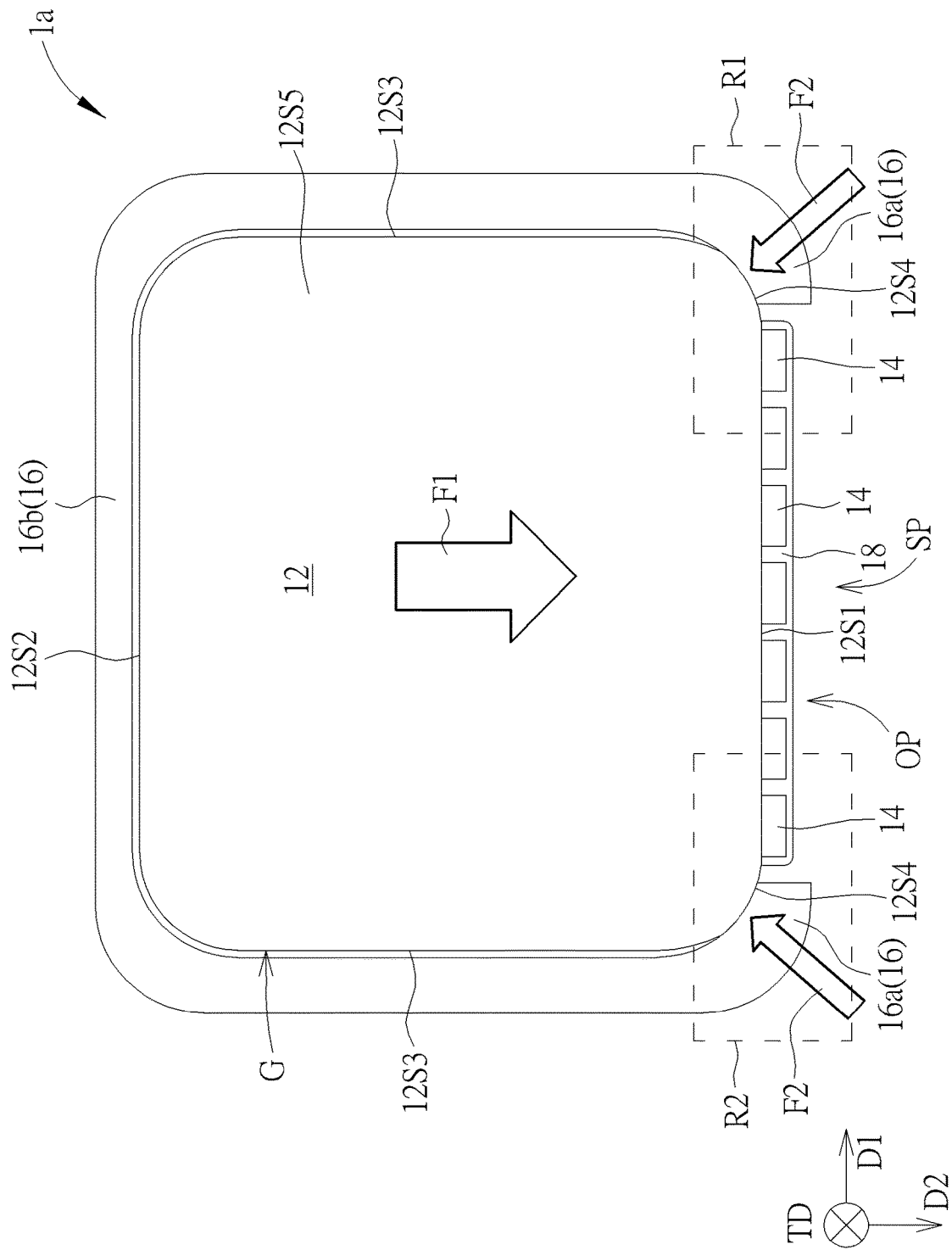
FIG. 1 is a schematic top view of a backlight module according to a first embodiment of the present invention.

The contents of the present invention will be described in detail with reference to specific embodiments and drawings. It is noted that, for purposes of illustrative clarity and being easily understood by the readers, the following drawings may be simplified schematic diagrams, and components therein may not be drawn to scale. The numbers and sizes of the components in the drawings are just illustrative and are not intended to limit the scope of the present invention.

Certain terms are used throughout the specification and the appended claims of the present invention to refer to specific components. Those skilled in the art should understand that electronic equipment manufacturers may refer to a component by different names, and this document does not intend to distinguish between components that differ in name but not function. In the following description and claims, the terms "comprise", "include" and "have" are open-ended fashion, so they should be interpreted as "including but not limited to . . . ".

The ordinal numbers used in the specification and the appended claims, such as "first", "second", etc., are used to describe the components of the claims. It does not mean that the component has any previous ordinal numbers, nor does it represent the order of a certain component and another component, or the sequence in a manufacturing method. These ordinal numbers are just used to make a claimed component with a certain name be clearly distinguishable from another claimed component with the same name. Thus, a first component mentioned in the specification may be called a second component.

Spatially relative terms, such as "above", "on", "beneath", "below", "under", "left", "right", "before", "front", "after", "behind" and the like, used in the following embodiments just refer to the directions in the drawings and are not intended to limit the present invention. It may be understood that the components in the drawings may be disposed in any kind of formation known by those skilled in the related art to describe or illustrate the components in a certain way. Furthermore, when one component is mentioned to overlap another component, it may be understood that the component may partially or completely overlap the another component.

In addition, when one component or layer is "on" or "above" another component or layer, it may be understood that the component or layer is directly on the another component, and alternatively, another component or layer may be between the component or layer and the another component or layer. On the contrary, when the component or layer is "directly on" the another component or layer, it may be understood that there is no intervening component or layer between the component or layer and the another component or layer.

As disclosed herein, the terms "about", "essentially", "substantially" or "same" generally mean within 10%, 5%, 3%, 2%, 1%, or 0.5% of the reported numerical value or range. The quantity disclosed herein is an approximate quantity, that is, without a specific description of "about", "essentially", "substantially" or "same", the quantity may still include the meaning of "about", "essentially", "substantially" or "same".

Refer to FIG. 1, which is a schematic top view of a backlight module according to a first embodiment of the present invention. As shown in FIG. 1, the backlight module 1a provided in this embodiment includes a light guide plate 12, a plurality of light-emitting components 14 and a frame 16. For clarity, the backlight module 1a in FIG. 1 only shows the light guide plate 12, the light-emitting components 14 and the frame 16, and other components are omitted, but the present invention is not limited thereto. For example, the backlight module 1a may further include a back plate, optical films and/or other suitable components.

As shown in FIG. 1, when viewed along a top view direction TD of the backlight module 1a, the light guide plate 12 includes a first side 12S1, a second side 12S2, and two third sides 12S3, wherein the first side 12S1 and the second side 12S2 are opposite to each other, and the third sides 12S3 are opposite to each other and located between the first side 12S1 and the second side 12S2. The third sides 12S3 are perpendicular to the first side 12S1. For example, when viewed along the top view direction TD, the first side 12S1 and the second side 12S2 may extend along a first direction D1, and the third sides 12S3 may extend along a second direction D2. The second direction D2 may be, for example, perpendicular to the first direction D1. In some embodiments, the first side 12S1, the second side 12S2 and the third sides 12S3 may be substantially parallel to the top view direction TD, for example. In some embodiments, the material of the light guide plate 12 may include, for example, poly (methyl methacrylate) (PMMA), glass or other suitable materials.

As shown in FIG. 1, the frame 16 covers the second side 12S2 and the third sides 12S3 of the light guide plate 12, and the frame 16 includes an opening OP and at least one buffer portion 16a. The light-emitting components 14 are disposed in the opening OP, and the buffer portion 16a is located on a side of the opening OP and contacts the light guide plate 12. It is noted that, through the contact between the buffer portion 16a and the light guide plate 12, the impact force F1 of the light guide plate 12 directed downward can be absorbed by the buffer portion 16a during a drop test and is not completely absorbed by the light-emitting components 14, thereby decreasing the impact on the light-emitting components 14. Accordingly, risks of the light-emitting components 14 being displaced, detached, or dropped can be reduced.

In this way, there is no need to install other components, and it only require the buffer portion 16a of the frame 16 to produce a buffer effect on the light guide plate 12. Accordingly, the backlight module 1a can meet design standards of panels with irregular appearances or appearances of large arc angle and can be applied to products with narrow borders, irregular appearances, appearances of large arc angle or the light-emitting components 14 having insufficient pull strength.

In the conventional technology which disposes the light-emitting components between the frame and the light guide plate, the impact force of the light guide plate toward the light-emitting components is directly absorbed by the light-emitting components, such that collinearity of original arrangement of the light-emitting components (in which the light-emitting components 14 may not be aligned in the first direction D1 due to process errors) is easily failed, and the arrangement of the light-emitting components cannot maintain in a good straight line. In this embodiment, the buffer portion 16a is not disposed on the side of the light-emitting components 14 facing away from the light guide plate 12, and the buffer portion 16a does not contact the light-emitting components 14. Therefore, the buffer portion 16a is not located on and in contact with the back side of the light-emitting components 14, so that the light-emitting components 14 are not sandwiched between the frame 16 and the light guide plate 12. In this way, when the impact force of the light guide plate 12 is directed toward the light-emitting components 14, the buffer portion 16a can absorb the impact force, such that the collinearity of original arrangement of the light-emitting components 14 is not easily affected.

In addition, in this embodiment, the light guide plate 12 may further include at least one fourth side 12S4 connected between the first side 12S1 and one of the third sides 12S3, wherein the fourth side 12S4 may not be parallel to the first side 12S1 and the third sides 12S3. When viewed along the top view direction TD, the fourth side 12S4 may be, for example, arc-shaped or other shapes that are not parallel to the first direction D1 and the second direction D2. As shown in FIG. 1, when viewed along the top view direction TD, as a point on the fourth side 12S4 is closer to the first side 12S1 (or one of the third sides 12S3), an angle between a tangent line of the point on the fourth side 12S4 and the first side 12S1 (or the one of the third sides 12S3) is less, but not limited thereto.

In FIG. 1, the light guide plate 12 may, for example, include two fourth sides 12S4, and each fourth side 12S4 may be connected between the first side 12S1 and the corresponding third side 12S3. For example, the first side 12S1, one of the fourth sides 12S4, one of the third sides 12S3, the second side 12S2, the other of the third sides 12S3, and the other of the fourth sides 12S4 may be sequentially connected to each other and surround the entire light guide plate 12.

As shown in FIG. 1, the light-emitting components 14 are disposed on the first side 12S1 of the light guide plate 12, and light generated from the light-emitting components 14 may enter the light guide plate 12 through the first side 12S1. For example, the light-emitting components 14 may be arranged side by side along the first side 12S1, and a light-emitting surface of each light-emitting component 14 may face the first side 12S1, so that the light from the light-emitting components 14 can be directly emitted toward the first side 12S1. The light-emitting component 14 may, for example, include a light-emitting diode chip, a light-emitting diode package or other suitable light-emitting components.

In this embodiment, the backlight module 1a may further include a circuit board 18, and the light-emitting components 14 may be disposed on the circuit board 18, so that the circuit board 18 may provide signals for controlling the light-emitting components 14. In this embodiment, at least one light-emitting component 14 may be in contact with the first side 12S1. In other words, the light-emitting component 14 may be assembled with the light guide plate 12 in a case of the light-emitting surface of the light-emitting component 14 contacting the first side 12S1 of the light guide plate 12, such that a distance between the light-emitting surface of at least one light-emitting component 14 and the first side 12S1 may be 0, thereby improving utilization efficiency of the light generated by the light-emitting component 14, but the present invention is not limited thereto. In the embodiment of FIG. 1, the light-emitting surfaces of all the light-emitting components 14 may be in contact with the first side 12S1, but not limited thereto. In some embodiments, during arranging the light-emitting components 14 in the first direction D1, the light-emitting surfaces of the light-emitting components 14 may not be arranged on the same plane parallel to the first direction D1 due to manufacturing errors. For example, a distance between planes of the light-emitting surfaces of two adjacent light-emitting components 14 in the second direction D2 may be in an error range of 0.1 mm, so that the light-emitting surfaces of a part of the light-emitting components 14 may not contact the first side 12S1. In some embodiments, according to the size of the applied display device (such as the display device 100 shown in FIG. 8), e.g., a display device of large size, such as television, all the light-emitting components 14 may not contact the first side 12S1, and a gap may exist between each light-emitting component 14 and the first side 12S1 so as to prevent the light guide plate 12 from being melted and damaged because the powers of the light-emitting components 14 are too large when the light-emitting components 14 directly contact the light guide plate 12, but not limited thereto.

Additionally, the light guide plate 12 may include a light-emitting surface 12S5 and a back surface (not shown) opposite to each other, and the light-emitting surface 12S5 and the back surface may be connected to the first side 12S1, the second side 12S2, the third sides 12S3 and the fourth sides 12S4. The light entering the light guide plate 12 may be guided by the light guide plate 12 and be substantially uniformly emitted out from the light-emitting surface 12S5, thereby forming a planar light source and serving as a light source for a corresponding display panel (such as the display panel 24 shown in FIG. 8). A normal direction of the light-emitting surface 12S5 may be, for example, the same as the top view direction TD of the backlight module 1a. In some embodiments, the light guide plate 12 may be disposed and fixed on the back plate in a way of the back surface facing the back plate.

Furthermore, for example, the number of the buffer portions 16a may be the same as the number of the fourth sides 12S4. In this embodiment, the frame 16 may, for example, include two buffer portions 16a bending and extending toward an inner side of the frame 16, and the buffer portions 16a respectively contact the corresponding fourth sides 12S4 of the light guide plate 12. In some embodiments, the buffer portions 16a may be symmetrical to each other with the second direction D2 as an axis of symmetry, and the fourth sides 12S4 may also be symmetrical to each other with the second direction D2 as the axis of symmetry, but not limited thereto.

Taking one buffer portion 16a and its corresponding fourth side 12S4 as an example, the buffer portion 16a may contact the fourth side 12S4 of the light guide plate 12, but not contact the first side 12S1. For example, when viewed along the top view direction TD of the backlight module 1a, a surface of the buffer portion 16a facing the light guide plate 12 may have a shape similar to that of the fourth side 12S4, such as arc or other shapes matching the fourth side 12S4, such that the surface of the buffer portion 16a facing the fourth side 12S4 may partially conform to the fourth side 12S4, thereby decreasing the impact force F1 generated from the light guide plate 12 on the light-emitting components 14 during the drop test. In this embodiment, a reaction force F2 generated by the buffer portion 16a with respect to the impact force F1 may reduce the influence of the impact force F1 on the light-emitting components 14. In some embodiments, the distance between the buffer portion 16a and the fourth side 12S4 of the light guide plate 12 may be, for example, about 0 to 0.15 millimeters (mm).

It is noted that since the fourth side 12S4 contacting the buffer portion 16a is not parallel to the first side 12S1 and the third sides 12S3, the buffer portion 16a can generate the reaction force F2 along a direction different from the second direction D2 to disperse the impact force when the buffer portion 16a carries the impact force F1 along the second direction D2. For example, the direction of the reaction force F2 may be different from the first direction D1 and the second direction D2. In this embodiment, the two buffer portions 16a may disperse the impact force F1 and form two reaction forces F2 which not only have parts for resisting the impact force F1 along the second direction D2, but also have parts respectively along the first direction D1 and a direction away from the first direction D1, but not limited thereto.

In addition, since the buffer portions 16a may extend toward an inner surface of the frame 16 facing the light guide plate 12, a width of the opening OP formed by the buffer portions 16a in the first direction D1 may be less than the maximum width of the light guide plate 12 in the first direction D1. Although there may be only one of the buffer portions 16a contacting the light guide plate 12 because of assembly errors, when the light guide plate 12 is displaced along the direction of the impact force F1 due to the drop test, the light guide plate 12 can simultaneously contact the buffer portions 16a. Accordingly, the impact force F1 can be dispersed and absorbed by the buffer portions 16a on two sides of the light guide plate 12. Because the buffer portions 16a are symmetrical to each other, the buffer portions 16a also can have a function of automatic-centering the light guide plate 12.

As shown in FIG. 1, the opening OP of the frame 16 in this embodiment may completely expose the first side 12S1, such that the frame 16 does not contact the first side 12S1. In this way, when the drop testis performed, the frame 16 will not receive the impact force F1 from the first side 12S1. The thickness of the light guide plate 12 may be less than 0.4 millimeters (mm), for example. In this case, since the buffer portions 16a do not contact the first side 12S1, corners of the light guide plate 12 may not be directly impacted by the reaction force F2 along a direction opposite to the second direction D2 while performing the drop test, so as to reduce fracture of the light guide plate 12. In other words, taking this embodiment as an example, the light guide plate 12 is an irregular quadrilateral with four arc corners, and both the number of the fourth sides 12S4 and the number of the buffer portions 16a are two. With this design, the fourth sides 12S4 can respectively conform to the buffer portions 16a of the frame 16 so as to decrease the impact force of the light guide plate 12, and the impact force can be dispersed and absorbed by two inner sides of the frame 16, thereby preventing the light-emitting components 14 from falling off or being inclined or elevated.

In some embodiments, the fourth sides 12S4 may not be exposed by the opening OP, so that the buffer portions 16a may cover the fourth sides 12S4, respectively, but not limited thereto.

Furthermore, the buffer portions 16a are not disposed on the side of the light-emitting components 14 facing away from the light guide plate 12, and the buffer portions 16a do not contact the light-emitting components 14. In other words, there is a space SP formed on the back side of the light-emitting components 14 facing away from the light guide plate 12, and the frame 16 (including the buffer portions 16a or other portions) does not contact the light-emitting components 14 and is located outside the space SP. In this way, the light-emitting components 14 are not clamped between the frame 16 and the light guide plate 12. During the drop test, although the impact force F1 of the light guide plate 12 is directed toward the light-emitting components 14, the impact force F1 can be dispersed and absorbed by the buffer portions 16a, and the light-emitting components 14 do not transmit the impact force F1 to the frame 16. Thus, the damage risk of the light-emitting components 14 is reduced, and the collinearity of the original arrangement of the light-emitting components 14 is not easily affected. Also, since the frame 16 does not need to be disposed in the space SP, it is beneficial to reduce a width of a frame border of the applied display device.

In addition, as shown in FIG. 1, the frame 16 may further include a main body portion 16b disposed on the second side 12S2 and the third sides 12S3 of the light guide plate 12. Moreover, the main body portion 16b can be separated from at least one of the second side 12S2 and the third sides 12S3 of the light guide plate 12 by a gap G, such that the light guide plate 12 may have a buffer space for thermal expansion and contraction without squeezing the frame 16. The gap G may be, for example, about 0.3 mm to 0.5 mm. As an example, the main body portion 16b may be formed by connecting three strips respectively corresponding to the second side 12S2 and the third sides 12S3, so that an inner surface of one of the strips (i.e., a surface of one of the strips facing a corresponding one of the second side 12S2 and the third sides 12S3) can be separated from the corresponding one of the second side 12S2 and the third sides 12S3 by the gap G. In some embodiments, the material of the frame 16 may include polycarbonate (PC) or other suitable materials.

Figure 2:
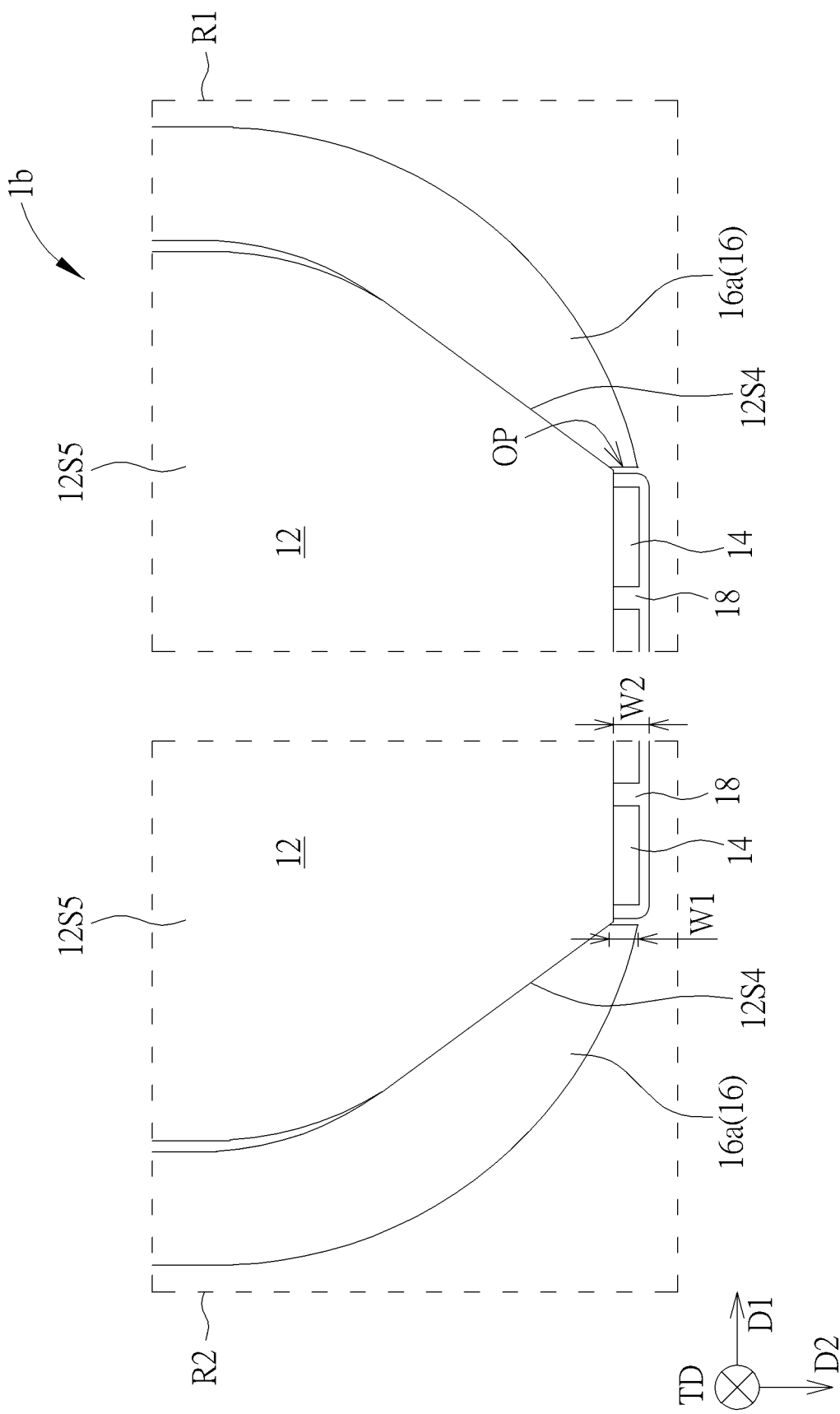
FIG. 2 is a schematic top view of a backlight module according to a variant embodiment of the first embodiment of the present invention.

Refer to FIG. 2, which is a schematic top view of a backlight module according to a variant embodiment of the first embodiment of the present invention, wherein FIG. 2 shows schematic enlarged structures of the backlight module 1b corresponding to a region R1 and a region R2 in FIG. 1. As shown in FIG. 2, in the backlight module 1b provided in this variant embodiment, a width W1 of a side of the buffer portion 16a corresponding to the opening OP in the second direction D2 can be reduced, for example, to be less than a width W2 of the circuit board 18 in the second direction D2. Other portions of the backlight module 1b of this variation embodiment may refer to the above embodiments and are not repeated in detail.

Figure 3:
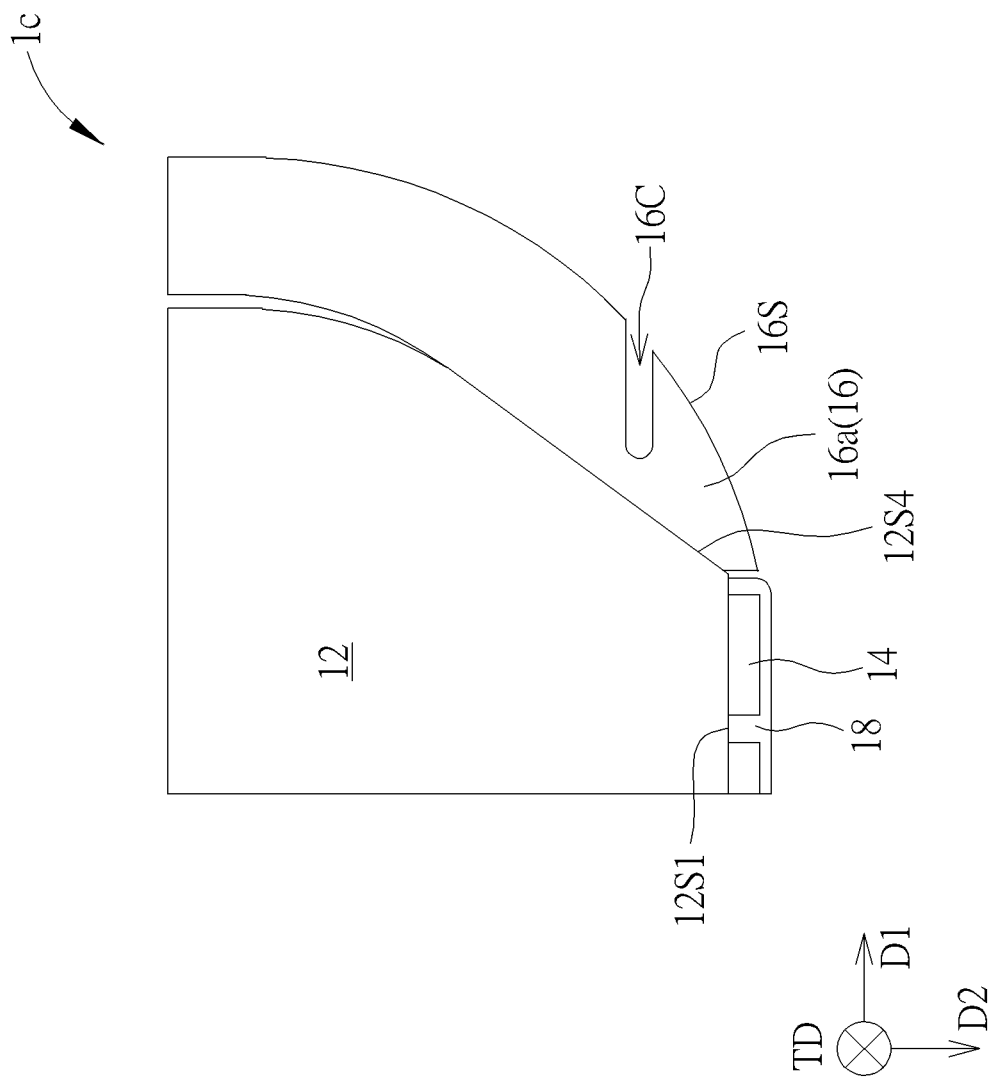
FIG. 3 is a schematic top view of a backlight module according to another variant embodiment of the first embodiment of the present invention.

Refer to FIG. 3, which is a schematic top view of a backlight module according to another variant embodiment of the first embodiment of the present invention. As shown in FIG. 3, in the backlight module 1c provided in this variation embodiment, the buffer portion 16a of the frame 16 may have at least one notch 16C on its outer surface 16S, so that the buffer portion 16a uses the notch 16C to generate a space for allowing the buffer portion 16a to have an ability to squeeze and deform when receiving the impact force, thereby decreasing the impact force. Preferably, the notch 16C may be, for example, strip-shaped and extend along the first direction D1 (i.e., extend laterally). Therefore, when the buffer portion 16a receives the impact force F1 toward the light-emitting components 14 (i.e., longitudinal impact force), portions respectively located on an upper side and a lower side of the strip-shaped notch 16C may have a space between them for compressing the portions to each other. Accordingly, the buffer portion 16a can absorb a larger impact range and can decrease the impact force more effectively. In some embodiments, when the frame 16 includes two buffer portions 16a, at least one of the buffer portions 16a may have the notch 16C. Other portions of the backlight module 1c of this variation embodiment may refer to the above embodiments and are not repeated in detail.

Refer to Table 1 below, which lists pull values of the light-emitting components of the conventional backlight module, the backlight module 1b in FIG. 2, and the backlight module 1c in FIG. 3 when the light-emitting components are separated from the light guide plate. For example, the conventional backlight module may refer to a structure of the frame surrounding the light guide plate and the light-emitting components.

As can be seen in Table 1, the pull values of the backlight module 1b in FIG. 2 and the backlight module 1c in FIG. 3 are greater than the pull value of the conventional backlight module, so that the falling off of the light-emitting components 14 can be significantly prevented during the drop test through the design of the above-mentioned buffer portion 16a. Moreover, as the size of the light-emitting component 14 becomes less and less, the adhesive force between the light-emitting component 14 and the circuit board 18 may be decreased, and in this case, the design of the buffer portion 16a can facilitate the reduction of the risk of the light-emitting component 14 falling off.

TABLE 1

|  | Conventional backlight module | Backlight module 1b in FIG. 2 | Backlight in module 1c in FIG. 3 |
| --- | --- | --- | --- |
| Pull value of a first test (kilogram-force (kgf)) | 4.35 | 7.61 | 7.08 |
| Pull value of a second test (kgf) | 4.19 | 7.83 | 6.98 |
| Pull value of a third test (kgf) | 4.07 | 7.56 | 7.37 |
| Average (kgf) | 4.20 | 7.67 | 7.14 |
| Percentage (%) | 100 | 182.6 | 170 |

Figure 4:
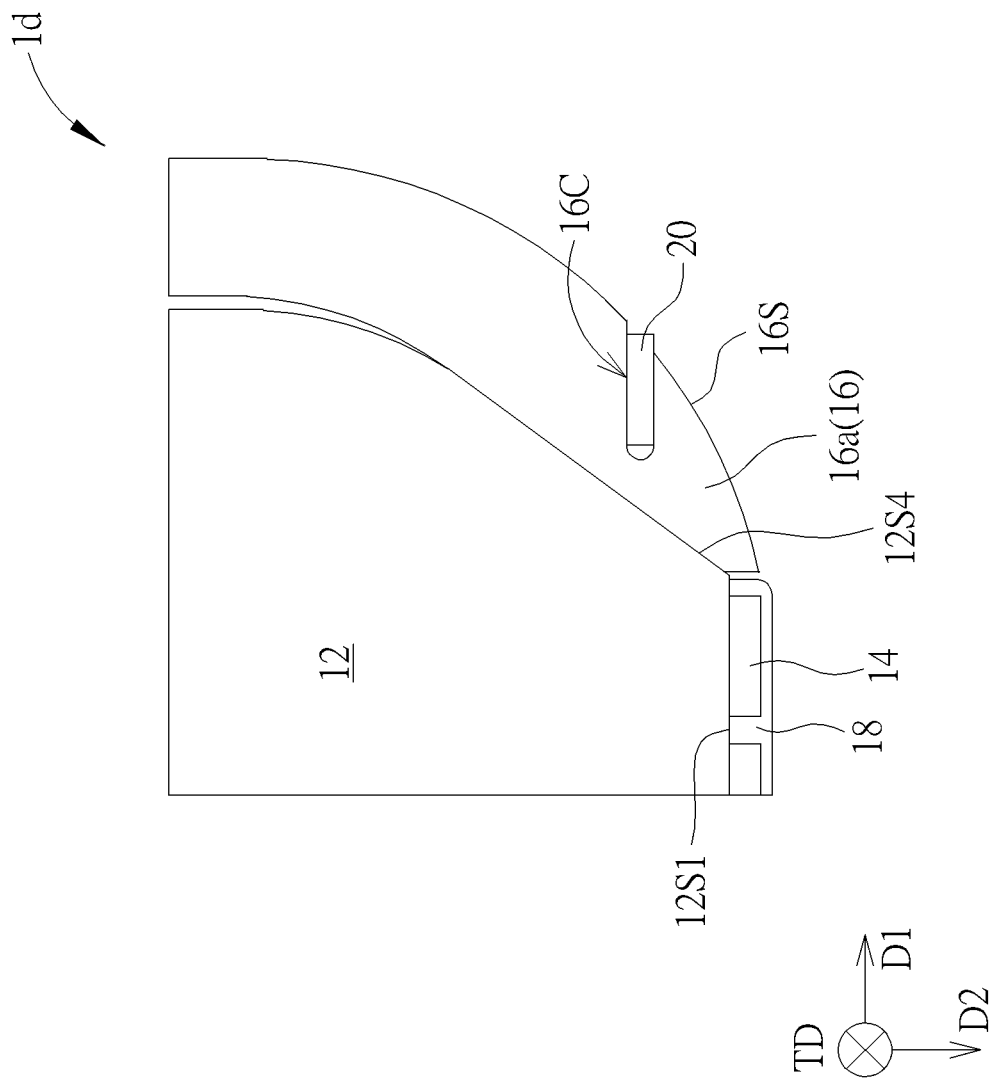
FIG. 4 is a schematic top view of a backlight module according to another variant embodiment of the first embodiment of the present invention.

Refer to FIG. 4, which is a schematic top view of a backlight module according to another variant embodiment of the first embodiment of the present invention. As shown in FIG. 4, the backlight module 1d provided in this variant embodiment differs from the backlight module 1c of FIG. 3 in that the backlight module 1d may further include at least one buffer member 20 disposed in the notch 16C. The buffer member 20 may, for example, include an elastic material, so that when the frame 16 is subjected to the impact force, the buffer member 20 may provide the buffer effect to decrease the impact force of the light guide plate 12. In some embodiments, the number of buffer member 20 may be the same as the number of the notch 16C. In this case, when the number of the notch 16C is plural, the number of buffer member 20 is also plural, and the buffer members 20 are respectively disposed in the corresponding notches 16C. Other portions of the backlight module 1d of this variation embodiment may refer to the above embodiments and are not repeated in detail. Compared with the structure of FIG. 3 that only have the notch 16C, since the structure of FIG. 4 further has the buffer member 20, the elastic material property of the buffer member 20 may improve the buffer effect. Moreover, the buffer ability of the buffer portion 16a may be adjusted by correspondingly altering the elastic coefficient of the buffer member 20.

Figure 5:
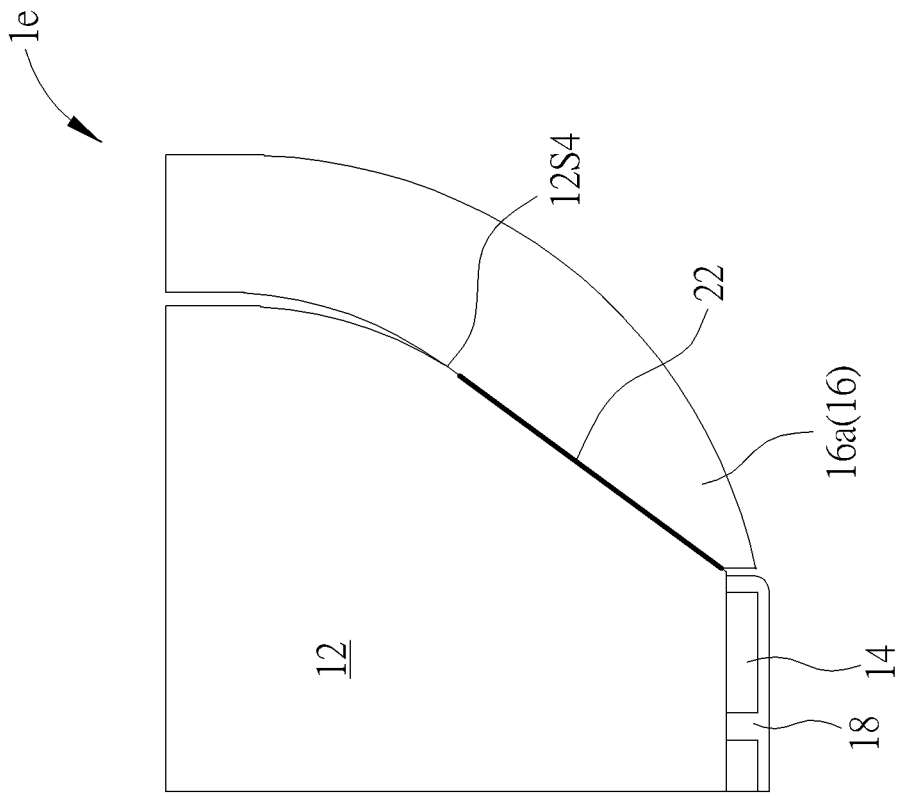
FIG. 5 is a schematic top view of a backlight module according to another variant embodiment of the first embodiment of the present invention.

Refer to FIG. 5, which is a schematic top view of a backlight module according to another variant embodiment of the first embodiment of the present invention. As shown in FIG. 5, the backlight module 1e provided in this variant embodiment differs from the backlight module 1b of FIG. 2 in that the backlight module 1e may further include a reflector 22 disposed on a surface of the buffer portion 16a facing the fourth side 12S4. The reflector 22 may be used to reflect light to increase the amount of light emitted from a region of the light-emitting surface of the light guide plate 12 adjacent to the buffer portion 16a, so as to solve the issue of dark area in this region resulted from light of the light-emitting components 14 is not easy to enter this region. Thus, the light-emitting uniformity can be improved. The reflector 22 may, for example, include metal or other suitable reflective layers. In some embodiments, the number of the reflector 22 may be the same as that of the buffer portion 16a, but not limited thereto. Other portions of the backlight module 1e of this variation embodiment may refer to the above embodiments and are not repeated in detail.

Figure 6:
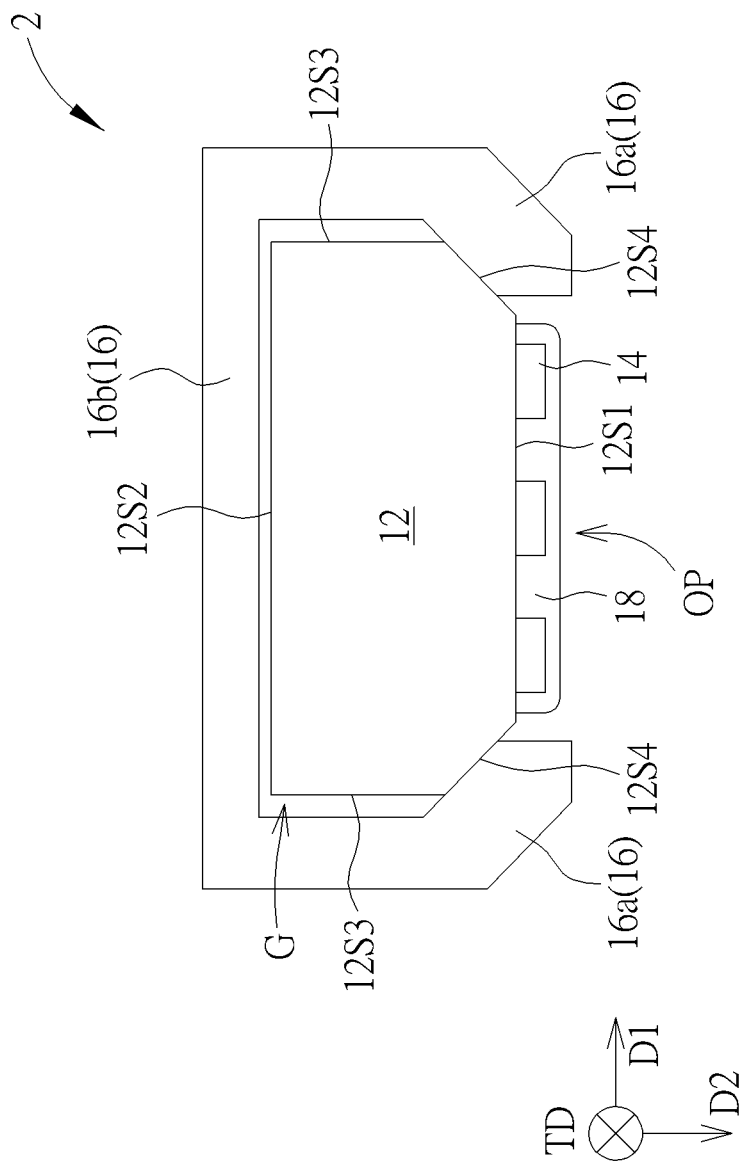
FIG. 6 is a schematic top view of a backlight module according to a second embodiment of the present invention.

Refer to FIG. 6, which is a schematic top view of a backlight module according to a second embodiment of the present invention. As shown in FIG. 6, the backlight module 2 provided in this embodiment differs from the backlight module 1a of FIG. 1 in that when viewed along the top view direction TD, a surface of the buffer portion 16a facing the light guide plate 12 is oblique linear. For example, the fourth side 12S4 of the light guide plate 12 may also be an oblique straight line. Other portions of the backlight module 2 of this embodiment may refer to the above embodiments and are not repeated in detail. Whether the buffer portion 16a is the arc-shaped buffer portion 16a shown in FIG. 1 or the oblique linear buffer portion 16a shown in FIG. 6, the frame 16 can have a structure bending inward. When the light guide plate 12 is displaced toward the light-emitting components 14, the light guide plate 12 may move until its two sides contact the frame 16. Because the buffer portions 16a are symmetrical to each other, even if the light guide plate 12 is a little misaligned during initial assembling the light guide plate 12, the light guide plate 12 can be automatic-centered when the light guide plate 12 is displaced, and there is a great possibility that not only one side is subjected to the impact force. Also, the reaction forces of the buffer portions 16a feed back to the light guide plate 12 may be decreased because the reaction forces are divided into different parts toward different directions. Therefore, when the drop test is performed, the impact force caused by the displacement of the light guide plate 12 will be dispersed and absorbed by the buffer portions 16a on both sides, and the light guide plate 12 will be automatic-centered.

Figure 7:
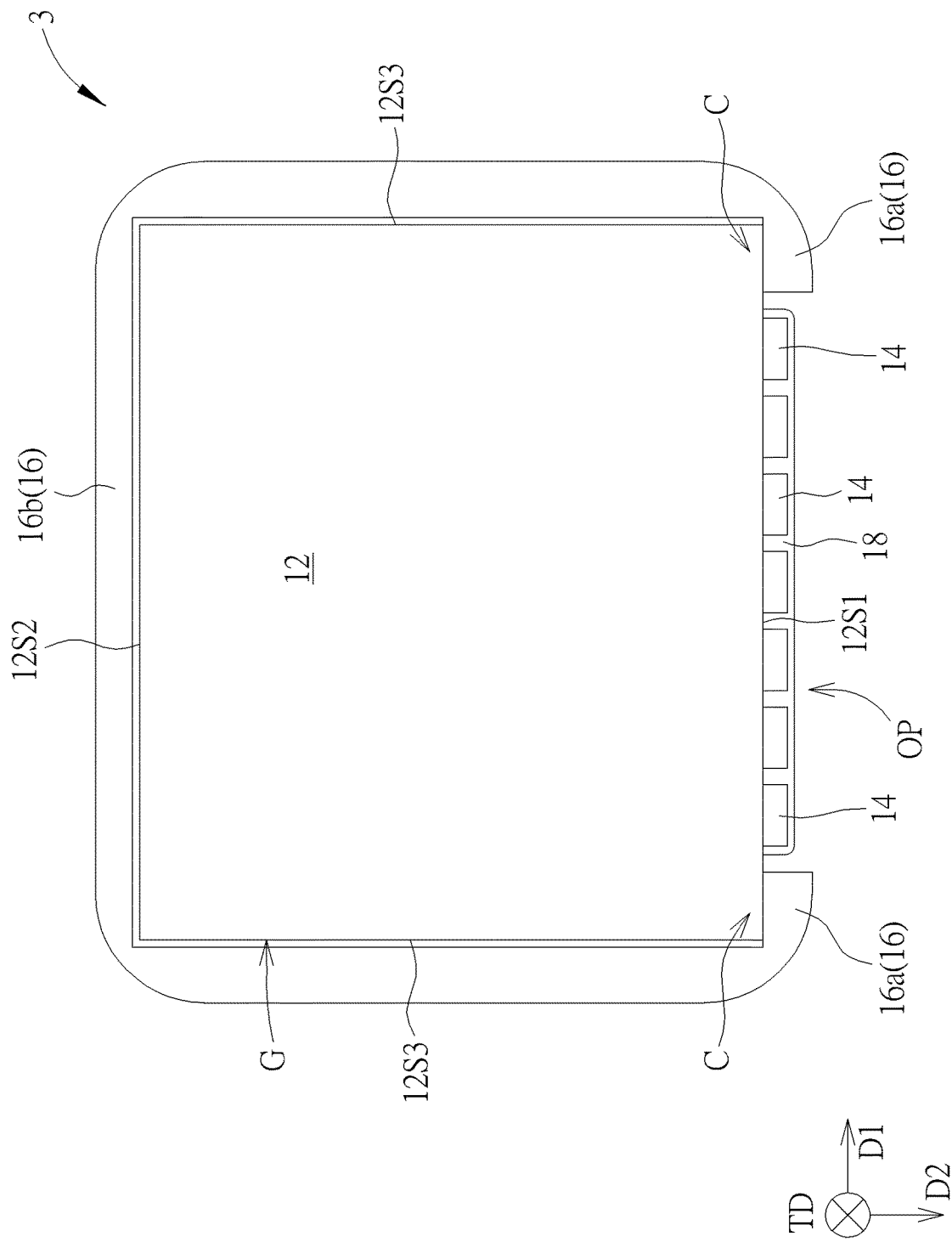
FIG. 7 is a schematic top view of a backlight module according to a third embodiment of the present invention.

Refer to FIG. 7, which is a schematic top view of a backlight module according to a third embodiment of the present invention. As shown in FIG. 7, the backlight module 3 provided in this embodiment differs from the backlight modules of the above embodiments in that the light guide plate 12 may not include the fourth sides, so that the third sides 12S3 are directly connected to the first side 12S1 to form right-angled corners C, wherein the inner surface of the frame 16 corresponding to the right-angled corner C may be a right-angled surface, and the surface of each buffer portion 16a facing the first side 12S1 is a plane. In this embodiment, since the frame 16 is an unenclosed frame without the fourth sides, while the light guide plate 12 is a general quadrilateral with four right angles, at least one corner connected to the first side 12S1 may conform to the corresponding buffer portion 16a of the frame 16. Accordingly, the impact force of the light guide plate 12 can be effectively decreased, thereby preventing the light-emitting components 14 from falling off or being inclined or elevated.

Figure 8:
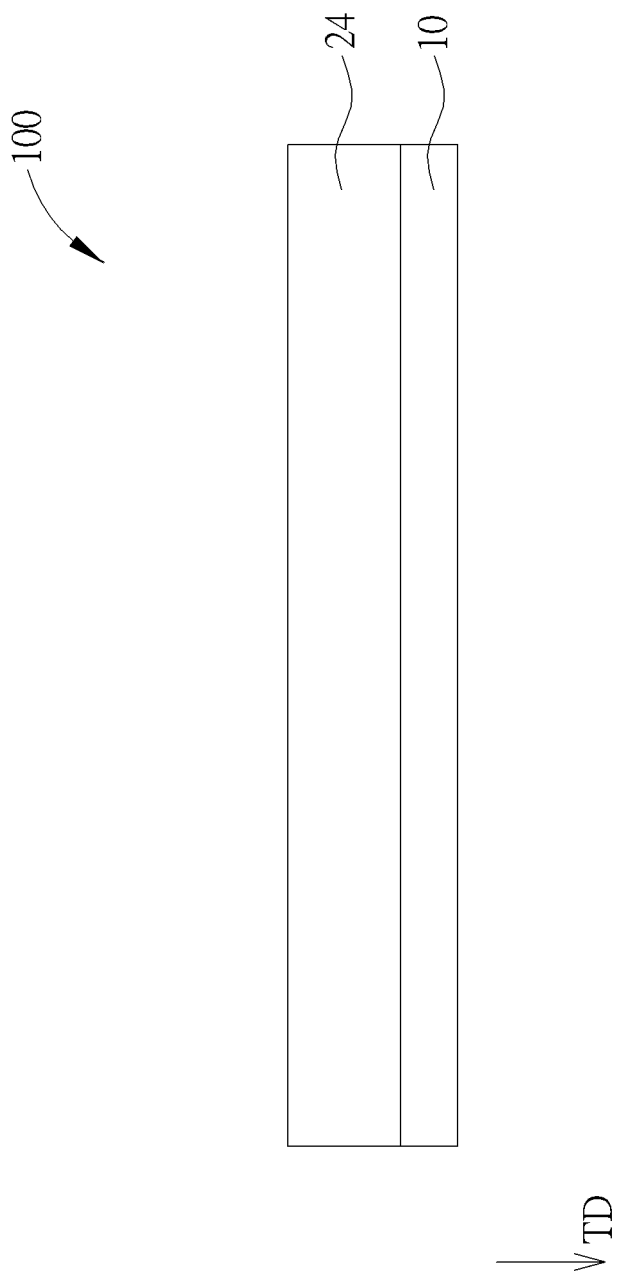
FIG. 8 is a schematic side view of a display device according to an embodiment of the present invention.

Refer to FIG. 8, which is a schematic side view of a display device according to an embodiment of the present invention. As shown in FIG. 8, the display device 100 provided in this embodiment may include a backlight module 10 and a display panel 24, and the display panel 24 may be disposed on the backlight module 10. The backlight module 10 is used to provide light to the display panel 24, and the display panel 24 may be a non-self-luminous display panel, such as an LCD panel or other suitable panels. The backlight module 10 may adopt the backlight module of any of the above-mentioned embodiments and will not be repeated herein.

In summary, in the backlight module of the present invention, the impact force of the light guide plate can be significantly decreased during the drop test by providing the opening and the buffer portions extending inward in the frame, thereby preventing the light-emitting components from falling off and improving the reliability of the backlight module. Especially, when the light guide plate is thinner, its strength will be weaker. Therefore, there is more need to provide the opening and the buffer portions in the frame to improve the buffer effect.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A backlight module, comprising:
a back plate;
a light guide plate disposed on the back plate and comprising:
   a first side and a second side opposite to each other; and
   two third sides opposite to each other and between the first side and the second side, and the third sides being perpendicular to the first side;
a plurality of light-emitting components disposed on the first side of the light guide plate, wherein light generated from the light-emitting components enters the light guide plate through the first side; and
a frame covering the second side and the third sides of the light guide plate, wherein the frame comprises an opening and at least one buffer portion, the light-emitting components are disposed in the opening to leave a space behind the light-emitting components, the frame is located outside of the space, and the buffer portion is located on a side of the opening and contacts the light guide plate;
wherein the light guide plate further comprises at least one fourth side connected between the first side and one of the third sides, the fourth side is not parallel to the first side and the third sides and has a substantially flat planar surface, and the buffer portion having a flat planar surface which matches and is capable of contacting the substantially flat planar surface of the light guide plate.

2. The backlight module as claimed in claim 1, wherein an outer surface of the buffer portion of the frame has a notch.

3. The backlight module as claimed in claim 2, further comprising a buffer member disposed in the notch.

4. The backlight module as claimed in claim 1, wherein the frame is separated from at least one of the second side and the third sides of the light guide plate by a gap.

5. The backlight module as claimed in claim 1, wherein at least one of the light-emitting components contacts the first side of the light guide plate.

6. The backlight module as claimed in claim 1, wherein the buffer portion is not disposed on a side of the light-emitting components facing away from the light guide plate, and the buffer portion does not contact the light-emitting components.

7. The backlight module as claimed in claim 1, further comprising a reflector disposed on the buffer portion.

8. The backlight module as claimed in claim 1, wherein the buffer portion of the frame contacts the fourth side and does not contact the first side.

9. The backlight module as claimed in claim 1, wherein the opening completely exposes the first side, and the fourth side is not exposed by the opening.

10. A display device, comprising:
    the backlight module as claimed in claim 1; and
    a display panel disposed on the backlight module.

\* \* \* \* \*